US006078612A

United States Patent [19]

Bertrand et al.

[11] Patent Number: 6,078,612

[45] Date of Patent: Jun. 20, 2000

[54] RADIO ARCHITECTURE FOR AN ADVANCED DIGITAL RADIO IN A DIGITAL COMMUNICATION SYSTEM

[75] Inventors: John Bertrand, Upper Nyack, N.Y.; Daniel M. Caprioni, Parsippany; Mitchell Friedman, Fairlawn, both of N.J.; Richard Alan Kwolek, Ft. Wayne, Ind.

[73] Assignee: ITT Manufacturing Enterprises, Inc., Wilmington, Del.

[21] Appl. No.: 08/857,990

[22] Filed: May 16, 1997

[51] Int. Cl.[7] ........................................ H04B 1/38

[52] U.S. Cl. .......................... 375/219; 375/132; 375/130; 455/73

[58] Field of Search .................................... 375/200, 202, 375/219, 295, 296, 316, 346, 130, 132; 370/310, 315, 339, 320; 455/73, 78, 295, 296

[56] References Cited

U.S. PATENT DOCUMENTS

| | | | |
|---|---|---|---|
| 5,450,395 | 9/1995 | Hostetter et al. | 370/320 |
| 5,579,341 | 11/1996 | Smith et al. | 375/267 |
| 5,862,171 | 1/1999 | Mahany | 375/200 |

*Primary Examiner*—Stephen Chin
*Assistant Examiner*—Chieh M. Fan
*Attorney, Agent, or Firm*—Saul Elbaum

[57] ABSTRACT

There is disclosed an improved multi-mode, spread spectrum digital radio comprising: a radio frequency (RF) subsystem for converting spread spectrum digital signals comprising voice and data communications between baseband and RF signal frequencies in response to control signals; a digital signal processor based baseband subsystem having isolation interface means bidirectionally coupled to the RF subsystem for minimizing RF and baseband signal interference; the baseband subsystem operable to control the mode of operation, to provide interface control signals to the RF subsystem based on the mode, to format the transmitted and received digital signals, and to provide external controls and status to a user to enable selectable mode switching.

32 Claims, 5 Drawing Sheets

BLOCK DIAGRAM OF RADIO ARCHITECTURE

GROUND VEHICULAR RADIO

AIRBORNE RADIO

| | |
|---|---|
| SC & FH (PT/CT) | STANDARD DATA MODES (SDM) 600/1200/2400/4800/9600/16000 BPS RATES |
| SC & FH (PT/CT) | ENHANCED DATA MODES (EDM) 1200/2400/4800/9600 BPS AND PACKET |
| SC-PT | ANALOG FM VOICE |
| SC/FH-CT | CVSD 16 KBPS VOICE |
| SC & FH (PT/CT) | RADIO RE-TRANSMIT (ALL VOICE, SDM/EDM DATA RATES AND MIXED MODES) |
| SC & FH (PT/CT) | REMOTE RADIO (2-WIRE) BOTH SINCGARS RADIO CONTROL UNIT (SRCU) AND RT (ALL VOICE AND SDM/EDM AND PACKET DATA RATES) |
| SC (PT/CT) | VOICE SCAN |
| GPS SITUATION AWARENESS (SA) | |
| PACKET SWITCHING NETWORKING WITH CSMA PROTOCOL | |
| HOMING | |

RADIO MODES

FIG.3

| SUBSYSTEM | FUNCTIONS |
|---|---|
| CONTROLLER/DISPLAY | CONTROL RED, BLACK, AND COMSEC. ROUTE, TRANSLATE, PROTECT, BUFFER, AND AMPLIFY SIGNALS FROM/TO FRONT PANEL CONNECTORS |
| RED PROCESSOR<br>RED I/O | SIGNAL (CVSD) AND DATA (DRA) PROCESSING<br>INTERFACES (PLGR, AUDIO/FSK)<br>PLAINTEXT BYPASS<br>CLOCK GENERATION AND MANAGEMENT (POWER REDUCTION, QUIETED CHANNELS) |
| COMSEC | COMSEC FUNCTIONS (PURGE, INITIALIZATION, PLAINTEXT BYPASS)<br>TRANSEC<br>HUB CONTROL<br>QUADRANT |
| BLACK PROCESSOR<br>BLACK I/O | WAVEFORM SYNTHESIS, FRAME AND BIT SYNCHRONIZATION, INTERLEAVING/DEINTERLEAVING;<br>FH GENERATION, FORWARD ERROR CORRECTION, CUE PROCESSING/DETECTION, SQUELCH PROCESSING, RETRANSMIT, TWO-WIRE REMOTE;<br>A/D AND D/A INTERFACES FOR RF MOD/DEMOD, TWO-WIRE, AND RE-TRANSMIT;<br>REAL-TIME CLOCK FOR TOD MAINTENANCE;<br>RF TIMING AND TUNING WORD INTERFACE;<br>TIMING GENERATION (MASTER CLOCK, RUBBER CLOCK) |

ARCHITECTURE COMPONENT FUNCTIONALITY

FIG.4

RADIO ARCHITECTURE FOR AN ADVANCED DIGITAL RADIO IN A DIGITAL COMMUNICATION SYSTEM

FIELD OF THE INVENTION

The invention relates to improvements in radio transceivers in digital communication systems, and more particularly, to architectural features for synchronizing independently operating processors and combining hardware and software control features to minimize signal interference and reduce power consumption of a portable and/or mobile radio.

BACKGROUND OF THE INVENTION

Digital radio for carrier telephony appeared in the early 1970's and was limited to modest spectral efficiencies and relatively short distances. The field has greatly grown over the past decades and the use of digital radio is widespread. Spread spectrum systems and, in particular, frequency hopping and direct sequence transmission systems, have produced results in communications, navigation and test systems that were not possible with standard signal formats. Frequency hopping signal transmission systems are a type of spread spectrum system in which the wideband signal is generated by hopping from one frequency to another over a large number of frequency choices. The frequencies used are chosen by a code similar to those used in direct sequence systems. In direct sequence systems a radio frequency (RF) carrier is modulated with two data streams in quadrature to produce a signal that is 0 degrees (in phase) when the data stream code represents a particular binary number (e.g. a "zero") and a signal shifted in phase when the data stream code represents the other binary number (e.g. a "one"). The SINGCARS (Single Channel Ground Airborne Radio System) radio system is a type of frequency hopping system that hops through the 30–88 MHZ band for transceiving voice and data communications in a variety of modes. For general background on spread spectrum systems, reference is made to a text entitled *Spread Spectrum Systems,* 2nd edition, by Robert C. Dixon and published by Wiley-Interscience, New York (1984). In order to increase the efficiency of digital radios employing spread spectrum characteristics, digital engineers have raised the number of modulation levels and have generally dealt with modulation/demodulation techniques, spectral shaping and synchronization schemes. This has led to widespread and more efficient use of the digital radio systems.

During the past decade, many improvements have been implemented involving advanced digital radio techniques. Digital radio is used both commercially and for the military. However, with the increased use and applications for digital radio systems, new designs for more compact, lightweight radios providing enhanced processing modes, greater fidelity and lower power are greatly desired. Past designs for two way radios have used multiple low performance microcontrollers for implementing the functionality of the radios. However, these constructions do not permit the use of high level language software for implementing and executing the various radio functions. Other designs employ microcontrollers in combination with customized hardware. However, this solution suffers by being relatively inflexible to adding new features and modes once a hardware configuration is finalized. Furthermore, many hardware implementations of radio functionality require a large amount of real estate to provide the necessary circuit configurations. In addition, noise resulting from stray signal interference and coupling between baseband and RF signals pose a further problem in current radio designs. Consequently, a low power software based radio architecture providing greater ease, flexibility, and reconfigurability for enhancing current operating modes and sophisticated features of digital radios while providing isolation between baseband and RF signals for minimizing interference is greatly desired.

SUMMARY OF THE INVENTION

It is an object of the present invention to provide an improved multi-mode, spread spectrum digital radio comprising: a radio frequency (RF) subsystem for converting spread spectrum digital signals comprising voice and data communications between baseband and RF signal frequencies in response to control signals; a digital signal processor based baseband subsystem having isolation interface means bidirectionally coupled to the RF subsystem for minimizing RF and baseband signal interference; the baseband subsystem operable to control the mode of operation, to provide interface control signals to the RF subsystem based on the mode, to format the transmitted and received digital signals, and to provide external controls and status to a user to enable selectable mode switching.

It is a further object of the invention to provide a controller for providing a user interface and for controlling a first and second digital signal processor means and a secure processor means via separate control signals, the first digital signal processor means responsive to a first control signal from the controller for transceiving external data signals indicative of the voice and data communications; the second digital signal processor means responsive to a second control signal from the controller for transceiving, modulating and demodulating baseband data signals indicative of the voice and data communications and for controlling the RF subsystem tuning parameters; the secure processor means bidirectionally coupled to the first and second digital signal processor means and responsive to a third control signal from the controller for encrypting/decrypting data signals indicative of the voice and data communications.

Yet another object of the invention is to provide a means for selectively energizing the baseband and the RF subsystems, the means selectively partitioned to minimize signal interference between the RF and the baseband subsystems, the means including: first energizing means for energizing the controller, first digital signal processor means, secure processor means and second digital signal processor means; and second energizing means for energizing the RF subsystem and the isolation interface means.

Still a further object of the invention is to provide a high speed data interface for transceiving baseband signals and a low speed data interface for transceiving RF signals within the isolation interface means in order to minimize RF and baseband signal interference.

BRIEF DESCRIPTION OF THE DRAWINGS

The invention is to be explained in more detail below based an embodiment depicted in the following figures where:

FIG. 3 is a diagram illustrating the various modes of operation provided by the present invention.

FIG. 4 is a diagram illustrating the various functions of the architecture components provided by the present invention.

DETAILED DESCRIPTION OF THE INVENTION

Figure 1:
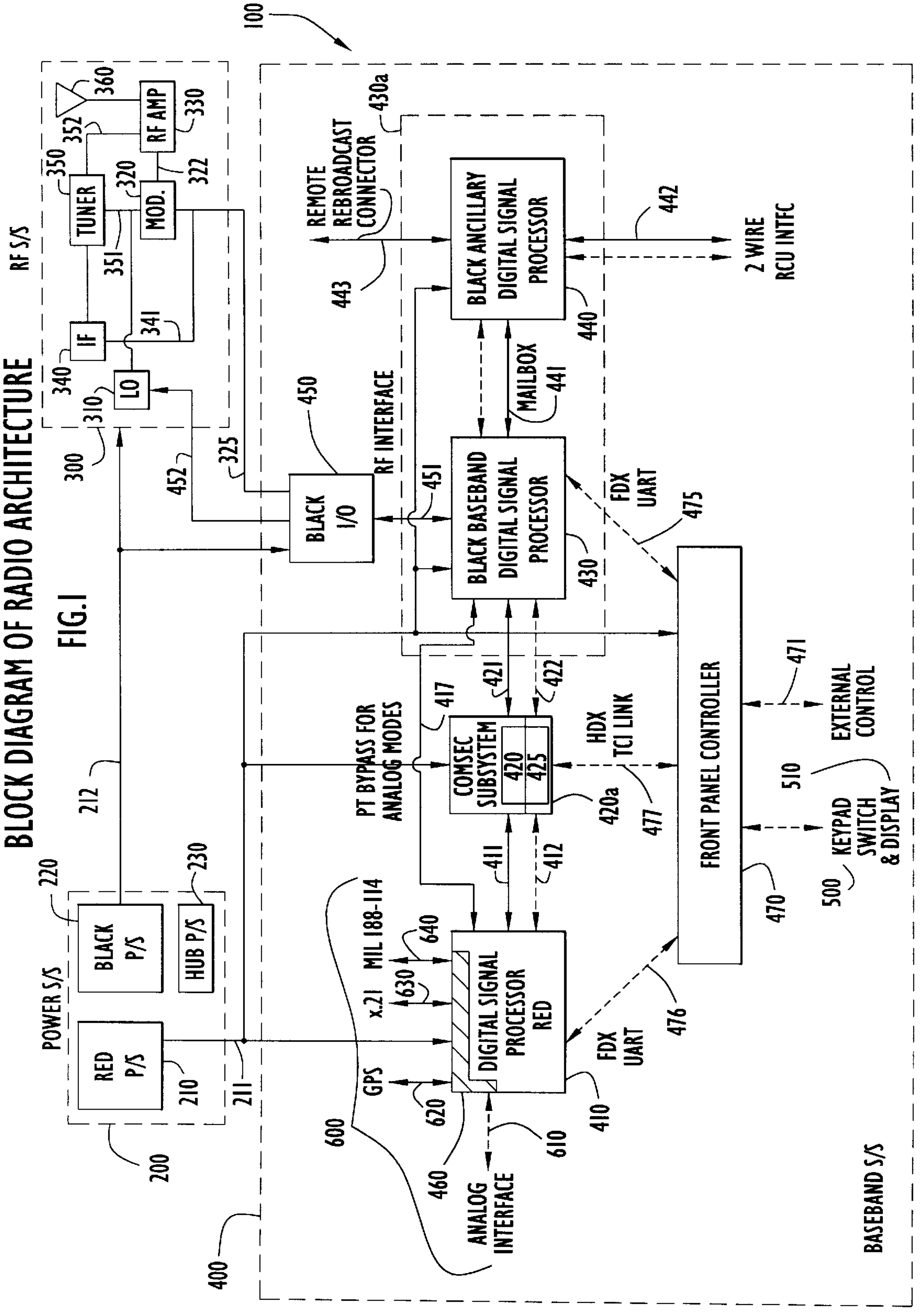
FIG. 1 is a diagram of the radio architecture.

In FIG. 1, a block diagram of the preferred embodiment of the invention is shown as radio 100. The radio 100 includes a power subsystem 200, an RF subsystem 300 and a baseband subsystem 400. Power subsystem 200 develops all voltages required by the baseband 400 and RF 300 subsystems and is divided into Red 210, Black 220, and Hold-Up Battery (HUB) 230 sources. Red power source 210 supplies power over line 211 to red digital signal processor 410, COMSEC subsystem 420*a*, black baseband digital signal processor 430, black ancillary digital signal processor 440, red I/O circuitry 460 and front panel controller 470. Black power source 220 supplies power over line 212 to the RF subsystem 300 components and to the black I/O circuitry 450 in order to selectively energize the baseband and the RF subsystems. This selective partitioning minimizes stray signal interference between the RF and baseband subsystems, thereby advantageously decreasing the noise factor inherent in the transmitted or received voice or data communication signal.

Figure 2A:
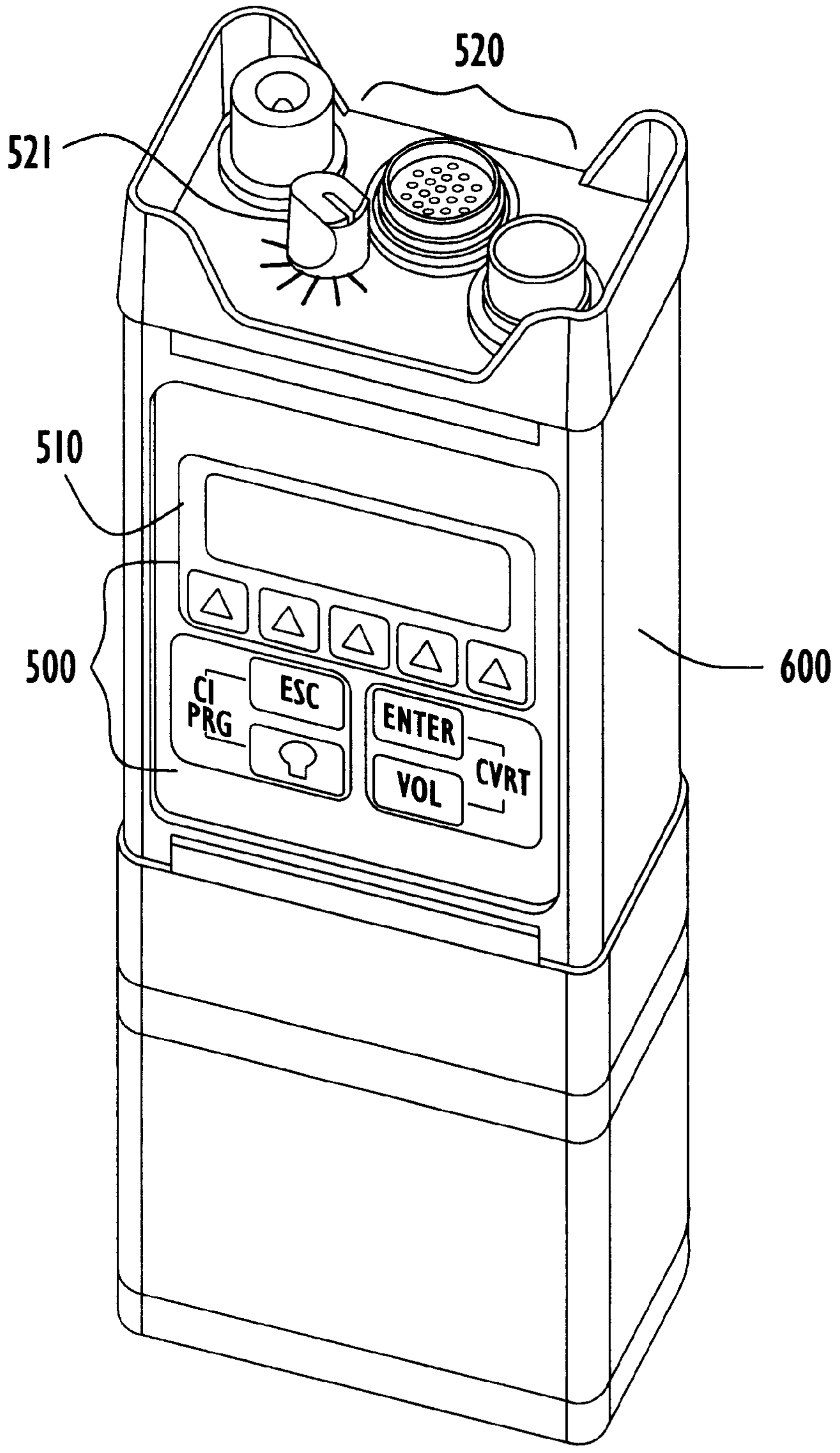
FIG. 2A is an exemplary diagram of a portable radio transceiver provided by the present invention.
Figure 2B:
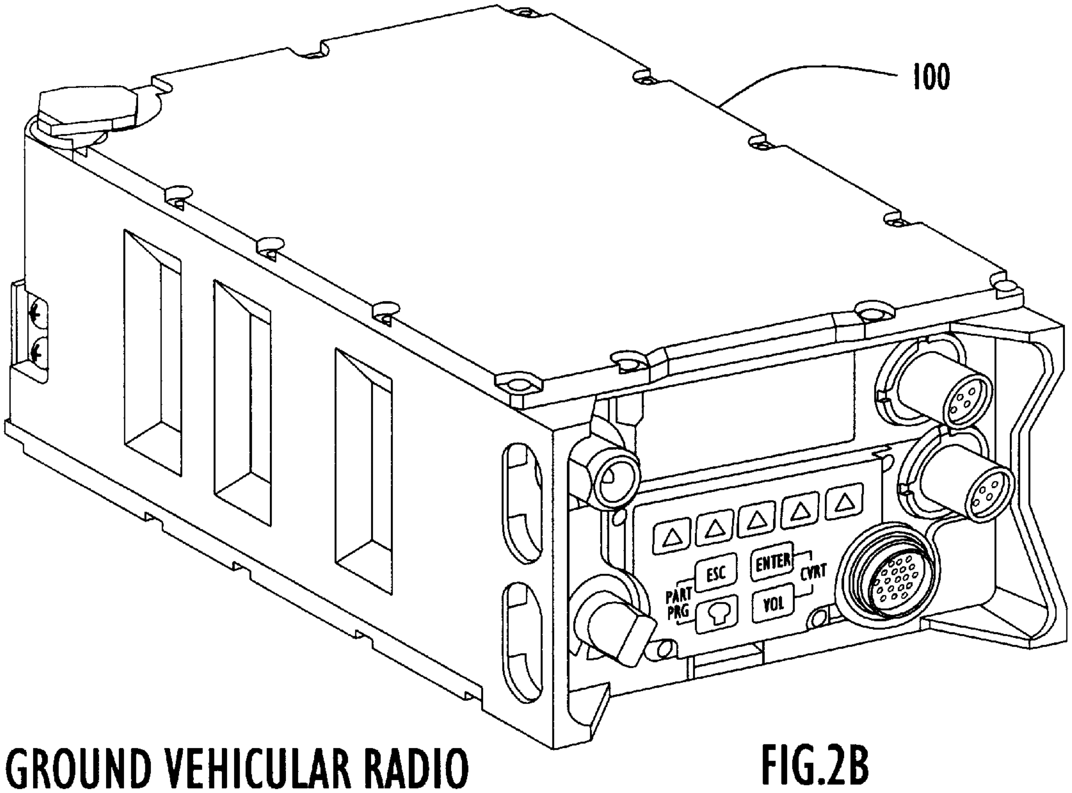
FIG. 2B is an exemplary diagram of a ground vehicular radio transceiver provided by the present invention.
Figure 2C:
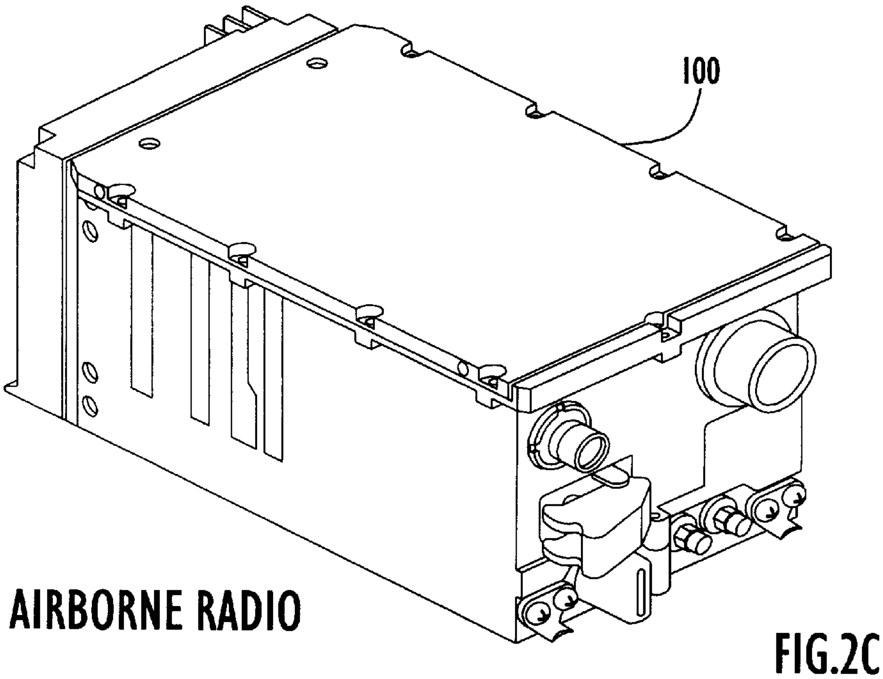
FIG. 2C is an exemplary diagram of an airborne radio transceiver provided by the present invention.

Front panel controller 470 manages all of the processing function of radio 100. Front panel controller 470 synchronizes and controls independently operating black baseband digital signal processor (BBP) 430 and red digital signal processor (red DSP) 410 by transmitting and receiving interrupt control signals over separate UART (universal asynchronous receive/transmit) interfaces 475 and 476. Front panel controller 470 also synchronizes and controls independently operating COMSEC subsystem 420*a* by transmitting and receiving interrupt control signals over HDX TCI (half duplex, collision avoidance) link interface 477. In a preferred embodiment, the front panel controller software is developed and maintained using the high level C language and utilizes multiple state machines to handle front panel man machine interface (MMI), external control devices and internal processor control. External events are handled on an interrupt basis and are processed on a time-sliced basis. Controller 470 provides external control over line 471 to a user for selecting and controlling multi-mode operation of radio 100. Referring to FIGS. 1 and 2A, keypad switch 500 and display 510 are provided on housing 600 for performing these operations. A controller panel 520 includes a mode selection switch 521 for controlling the mode of radio 100. The keypad switch 500 and display 510 include frequency selection, volume control, signal strength indication, and battery status. In a particular embodiment illustrated in FIG. 2A, the novel radio architecture is enclosed in a compact, lightweight, and portable housing and is small enough to fit in a front shirt pocket. This design allows for convenient placement or concealment of the radio in a variety of locations, as well as providing the means for maintaining direct communications with an individual while in transit either on the ground or in a vehicle. FIGS. 2B and 2C show alternative embodiments of the radio 100 used for ground vehicular and airborne applications. In a preferred embodiment, front panel controller 470 includes an 80C51 variant microcontroller complemented with 256K×8 bank-switch program memory FLASH PROM, 32K×8 data memory RAM, and 1K×8 EEPROM. Memory mapped registers are provided to interface between the microcontroller and the display, keypad, function switches, Red DSP UART, BBP UART, and COMSEC UART.

The various modes of operation for multimode radio 100 are identified in FIG. 3. Each of those modes is first configured as either in "Transmit" or "Receive" mode. When radio 100 is configured in "Transmit" mode, controller 470 notifies BBP 430 over line 475 via an interrupt control signal to condition for passing data over high speed data interface line 451 for RF over the air waveform processing or for passing data over high speed asynchronous parallel interface 441 for processing and 2-wire or remote rebroadcasting transmission by black ancillary digital signal processor (BADSP) 440. Similarly, when a request is made to place radio 100 in "receive" mode, controller 470 transmits an interrupt control signal over line 475 to BBP 430 to condition for receiving data over high speed data interface line 451 RF signal data for down-conversion and demodulation or for receiving data over high speed asynchronous parallel interface 441 from BADSP 440 of 2-wire or remote rebroadcasting transmission data. Control signal interrupts are also sent from controller 470 to BBP 430 indicating whether the particular mode is single channel (SC) or frequency hop (FH). For each type, BBP 430 conditions or performs a software algorithm embedded in the DSP to perform the appropriate type of signal processing. By way of example, selection of Standard Data Mode (SDM) FH configuration at 2400 bps cipher text (CT) transmission and depression of voice function key on the panel display conditions controller 470 to initiate interrupts over line 475 notifying BBP 430 to make preparations for 2400 bps digital FH transmission of CT voice data. Controller 470 also transmits control interrupts over line 476 to red DSP 410 and over line 477 to COMSEC 420 to prepare for processing and encrypting voice data. BBP 430 sends control signals over line 422 and data over line 421 to COMSEC 420 and synchronizes clocks to ensure proper data and control signal transfer. Analog voice data is received over interface line 610 by red I/O circuitry 460, A/D converted, filtered and processed and passed to red DSP 410 for further data processing. Software DSP algorithms are executed in red DSP 410 to further condition the received signal. At the completion of red DSP processing, red DSP notifies COMSEC 420 over full duplex serial control line 412 and passes the data signal over data line 411. COMSEC 420 encrypts the data according to control information and data type and notifies BBP 430 over full duplex serial control line 422 and passes the data signal over data line 421. BBP 430 further processes the data by executing a series of DSP algorithms for FH generation, waveform synthesis, bit and frame synchronization, and data interleaving and passes the baseband data over high speed data line 451 to black I/O circuitry 450. Black I/O receives the baseband data and performs additional filtering in addition to tuning the transmitter before passing the data to modulator 320 over low speed data line 325. The baseband signal is converted to an RF signal at the RF subsystem 300 by local oscillator 310 and RF amp 330 and transmitted as an over the air encrypted waveform for reception and decoding by another radio.

RF subsystem 300 converts data signals between the baseband frequencies and the transmitted RF signal frequency at the antenna. The RF subsystem 300 comprises a local oscillator (LO) 310 for producing a reference signal having a frequency fo, a modulator 320, an IF module 340 coupled to modulator 320 over line 341, a receive tuner 350 coupled to modulator 320 over line 351, and RF transmitter 330 having a first terminal coupled to the receive tuner and modulator over lines 352 and 322, respectively, and a second terminal coupled to the antenna 360 for transmitting and receiving RF digital signals.

Red I/O circuitry 460 provides the interface between external data segments 600 and red digital signal processor 410. In response to a particular mode of operation such as analog FM voice, CVSD 16 KBPS voice, SDM, or EDM, red I/O circuitry 460 transmits and receives analog voice data over analog interface 610. In response to Global Positioning System (GPS) situation awareness mode, Red I/O circuitry 460 transmits or receives GPS data over RS-232 asynchronous interface 620. Packet waveform data over x.21 is transmitted and received over interface 630 in response to selection of Packet switching networking mode and Enhanced Data Mode packet switching. Digital data at specified frequencies ranging between 600 bps and 16 kbps is transmitted and received over MIL-STD 188-114 synchronous interface 640 for SDM and EDM modes. Red I/O 460 operates in a receive mode for receiving data from external segments 600 and includes analog input circuitry for amplifying, filtering, sampling, and converting analog voice data over interface 610 to digital samples for processing by red digital signal processor 410. Red I/O 460 also contains digital circuitry and digital drivers for processing digital signals received over interfaces 620, 630 and 640 for input to red digital signal processor 410. Operating in a transmit mode, red I/O 460 includes analog output circuitry for sampling output digital data signals from Red Processor 410, performing D/A conversion to an analog signal, filtering and amplifying the analog signal to the desired level and transmitting over interface 610. Similarly, Red I/O 460 also contains digital circuitry and digital drivers for processing digital data signals received from Red Processor 410 and transmitting over interfaces 620, 630 and 640 to external segments.

Red DSP 410 is initialized by a control signal from controller 470 over UART interface line 476 identifying the particular mode of operation and relevant parametric data. In a preferred embodiment, red DSP 410 performs signal processing of signals in CVSD mode and data (DRA) processing mode and contains a TI 320C5X fixed point DSP. Data samples are obtained and provided to the Red I/O circuitry 460 via interrupts to red DSP 410. Data is passed between red DSP 410 and COMSEC circuitry 420 over synchronous serial full duplex data line 411. Red processor 410 transmits and receives control data to COMSEC processor 420 over serial full duplex control line 411. When operating in Analog FM Voice PT (Plain Text) Bypass mode, red DSP 410 passes and receives signal data directly with BBP 430 without passing data to COMSEC 420. In a preferred embodiment, red DSP 410 includes 1 MEG X 16 bank switched program memory Flash PROM and 512 K×16 bank switched static RAM for data memory. Upon completion of a particular task, red DSP 410 transitions to a low power "wait" state until notified by control signal to prepare for further processing. This provides for a lower power consumption for radio 100 during idle processing times. The COMSEC subsystem 420*a* includes a COMSEC circuitry 420 initialized by a control signal from controller 470 over asynchronous interface line 477 for specifying the particular mode of operation (CT or PT) and control and status information. A TRANSEC processor 425 is also included within the COMSEC subsystem. The COMSEC circuitry 420 is a cryptographic engine providing cryptographic encoding and decoding of data passed to it by either the red DSP 410 or black DSP 430 for securing communications and transmissions. The COMSEC circuitry 420 communicates over synchronous serial and control interfaces with the red processor 410 over lines 411 and 412 and with BBP 430 over lines 421 and 422. The TRANSEC processor 425 interfaces directly with BBP 430 for transmitting the encrypted data to the RF subsystem 300 for over the air transmission.

The black processor subsystem 430*a* comprises black baseband digital signal processor (BBP) 430 and black ancillary digital signal processor (BADSP) 440. BBP 430 performs the primary radio functions as identified in FIG. 4 including waveform processing, frame and bit synchronization, and frequency hop (FH) generation. BADSP 440 performs ancillary processing functions such as retransmit and remote control modem functions. In a preferred embodiment the BBP, ancillary DSP and red DSP software is developed and maintained using 320C5X assembly language in order to meet the timing requirements of SINGCARS waveforms. In the preferred embodiment, the DSP software as well as the controller software employs multiple state machines and executes on an ITT proprietary operating system. Both the ancillary and BBP DSPs communicate with each other over a high speed asynchronous parallel bus interface 441. Retransmit mode transmission enables BADSP 440 to receive data from BBP 430 over interface 441 and pass the data over 2-wire interface line 442 for retransmission at another radio. Similarly, Retransmit mode reception enables BADSP 440 to receive data over 2-wire interface line 442 and pass the data over interface line 441 to BBP 430 for transmission at RF subsystem 300. Analogously, remote broadcast transmit mode enables BADSP 440 to receive data from BBP 430 over interface 441 and pass the data over remote rebroadcast connector 443 for retransmission at another radio. In addition, remote broadcast mode reception enables BADSP 440 to receive data over remote rebroadcast connector 443 and pass the data over interface line 441 to BBP 430 for transmission at RF subsystem 300. Upon completion of a particular task, BBP 430 and BADSP 440 conserve energy by transitioning to a low power "wait" state until notified by a control signal or by receiving input over their data lines to prepare for further processing. BBP 430 has a data interface for receiving and passing data to the COMSEC subsystem 420*a* over line 421 and, when placed in "Transmit" mode by controller 470, performs the appropriate processing on data received from COMSEC 420*a* to create a waveform for transmission by RF subsystem 300. Upon completion of waveform processing by BBP 430, the BBP passes output waveform samples at baseband frequencies to Black I/O circuitry 450 over high speed data line 451. The Black I/O circuitry receives the data samples and prepares the data for transmission to the RF subsystem. Black I/O circuitry 450 thus provides the interface between the digital radio baseband and the RF 300, Remote RF (not shown), or another retransmit radio (not shown). Depending on the type of signal to be transmitted, black I/O circuitry 450 performs A/D or D/A high speed conversion, signal filtering and signal amplification to condition the data for transmission to RF 300. Black I/O also provides digital interfaces for interfacing to digital RF techniques, such as Direct Digital Synthesizers (DDS—not shown). Black I/O 450 passes data to modulator 320 over low speed data line 325 in order to minimize interference between the signal to be transmitted and noise resulting from the clocking frequency of the BBP DSP's internal clock. BBP DSP 430 provides master clock control for synchronously passing and receiving data among red DSP 410, COMSEC 420 and BBP DSP 430. Each internal clock associated with red DSP 410 and COMSEC 420 is synchronized from the BBP DSP clock frequency. A typical BBP clock frequency of 40 MHZ is required because of the high speed data transmission within the baseband subsystem. However, a frequency of 40 MHZ is within the VHF transmission bandwidth for RF transmission and reception. In order to isolate the RF transmitted and received data signals from any interference noise resulting from the high speed clocking frequency, the black I/O 450 is configured to provide a high speed interface with BBP 430 and a low speed interface with RF subsystem 300. Furthermore, because the black I/O 450 represents the only interface with RF signal frequencies, the black I/O serves to buffer the baseband signals from the RF signals to minimize interference due to noise. In addition to data signals, BBP 430 communicates control information to RF subsystem 300 through black I/O 450 to control and tune the RF. BBP control information is delivered over high speed data line 450 and delivered to LO 310 and modulator 320 over lines 452 and 325 to control RF processing and includes frequency receiver tuning, transmit enable, hop interval, and power level. Digital samples are obtained from the black I/O 450 from the RF subsystem 300 during radio 100 receive and idle times. During idle, the BBP 430 processes these samples to determine if an incoming signal is present. Once a signal is found, the BBP 430 wakes up the other processors, performs the receive processing and passes the demodulated information to the COMSEC 420 subsystem. The BBP has several peripheral I/O devices. In a preferred embodiment, a Reed-Solomon encoder/decoder ASIC is used for coding and decoding digital signals. Each BBP and ancillary DSPs consist of TI 320C5X DSPs. Preferably, both processors have 1 MEG×16 of bank switched program flash EPROM and bank switched 256 K×16 static data memory RAM.

Both the red DSP, BBP and BADSPs host a variety of state-of-the-art signal processing algorithms including multi-rate, polyphase, finite impulse response (FIR) filters, infinite impulse response (IIR), windowed and warping filter functions, and software adaptive correlation techniques. These signal processing techniques formerly implemented in hardware are now implemented as DSP software programs.

By way of example, single channel (SC) plaintext (PT) voice mode is implemented as a series of software DSP algorithms in BBP and red DSP and include fast attack voice/FSK AGC, audio interpolation/decimation filtering, insertion, detection and notching of the 150 Hz pilot tone, FM pre-emphasis and de-emphasis. The DSP architecture has enhanced radio performance over prior art solutions. As an example, the 150 Hz pilot tone removal filter is required to have a notch depth of 40 dB. Using tap warping techniques, this filter function has been successfully combined with the de-emphasis filter while achieving a notch depth in excess of 80 dB's.

Another example of a hardware function now implemented as a radio BBP DSP software process is the frequency hopping (FH) acquisition and synchronization process. Prior art design implemented this function in hardware as single bit inphase and quadrature correlators. In the novel radio architecture of the present invention, this function is implemented as real-time multi-bit software correlators with added interpolation correlation fitting. As a result, the FH acquisition process is achieved within ⅛ of a bit time with significant improvements in false detections, false rejections, and range performances.

The novel architecture permits added growth functions by enabling future DSP software enhancements such as voice compression processing, multi-bit IF FM demodulation and multi-symbol coded modulation (and demodulation) waveform schemes to be implemented with little, if any, changes to the present hardware configuration. Although modifications to controller 470 and software enhancements to red, BBP and black ancillary DSPs may be required, the architecture provides for flexibility in reconfiguring and adding new functionality, thereby providing a low power, flexible, and more responsive digital radio transceiver.

While specific circuit implementations have not been shown, it is indicated that one skilled in the art would have no difficulty in implementing the digital circuitry and architecture required to produce the above described functions.

What is claimed is:

1. A digital communication device for transmitting and receiving voice and data communications, comprising:

a radio frequency (RF) subsystem for converting digital signals between baseband and RF signal frequencies in response to control signals;

a digital signal processor based baseband subsystem having an isolation interface bidirectionally coupled to said RF subsystem for transceiving RF signals at a first data rate and transceiving baseband signals at a second data rate to minimize signal interference between said RF and said baseband signals, said baseband subsystem operable to control a mode of operation of the digital communication device, to provide said control signals to said RF subsystem based on said mode of operation, and to provide external controls and status to a user to enable selectable mode switching, wherein said baseband subsystem includes:

a controller for providing a user interface for managing said mode of operation and for controlling first and second digital signal processors and a secure processor via separate control signals;

said first digital signal processor responsive to a first control signal from said controller for transceiving external data signals indicative of said voice and data communications;

said second digital signal processor responsive to a second control signal from said controller for transceiving, modulating and demodulating baseband data signals indicative of said voice and data communications and for communicating with said RF subsystem; and said secure processor means bidirectionally coupled to said first and second processors and responsive to a third control signal from said controller for encrypting/decrypting data signals indicative of said voice and data communications.

2. The digital communication device of claim 1, further comprising:

an interface responsive to said first digital signal processor and to at least one external interface and having a first channel for receiving said external data signals and transmitting to said first digital signal processor, and a second channel for receiving processed output signals from said first digital signal processor and transmitting to said at least one external interface;

wherein said first digital signal processor is operable in: a first mode for receiving said external data signals from said interface and sending first processed signals to said secure processor in response to said external data signals; and a second mode for receiving said encrypted/decrypted data signals from said secure processor and sending said processed output signals to said interface means in response to said encrypted/decrypted data signals;

said first digital signal processor including means responsive to said first control signal from said controller, for selecting said mode of operation.

3. The digital communication device of claim 2, wherein said interface includes A/D and D/A converters, analog and digital amplifiers, and FIR and IIR filters.

4. The digital communication device of claim 2, wherein said at least one external interface includes:

an analog voice interface;

a global positioning system (GPS) data interface;

a packet waveform interface; and a multi-bit rate MIL 188-114 interface.

5. The digital communication device of claim 1, wherein said second digital signal processor includes:

a baseband digital signal processor for modulating, demodulating and processing baseband signals representative of said voice and data communications and having a first bidirectional channel coupled to said isolation interface, a second bidirectional channel coupled to said secure processor, a third bidirectional channel coupled to said first digital signal processor and a fourth bidirectional channel coupled to an ancillary digital signal processor, wherein said baseband digital signal processor is operable in:

a first mode for receiving said encrypted/decrypted data signals from said secure processor and sending processed baseband signals indicative of said voice and data communications to said isolation interface for RF transmission in response to said encrypted/decrypted data signals;

a second mode for receiving signals indicative of said received RF signals from said isolation interface and sending processed baseband receive signals to said secure processor in response to said received RF signals;

a third mode for transceiving voice baseband signals indicative of said voice communications between said first digital signal processor over said third bidirectional channel; and a fourth mode for transceiving data processing signals between said ancillary digital signal processor over said fourth bidirectional channel:

wherein said baseband digital processor includes means responsive to said second control signal from said controller, for selecting said mode of operation.

6. The digital communication device of claim 5, wherein said bidirectional channel is a high speed asychronous parallel interface.

7. The digital communication device of claim 1, further including a power subsystem configured to selectively energizing said baseband and said RF subsystems, said power subsystem being selectively partitioned to minimize signal interference between said RF and said baseband subsystems, and comprising:

a first power source for energizing said controller, first digital signal processor, secure processor and second digital signal processor; and a second power source for energizing said RF subsystem and said isolation interface.

8. The digital communication device of claim 1, wherein said first and second digital signal processors are coupled to said controller over a high speed serial interface.

9. The digital communication device of claim 1, wherein said secure processor is bidirectionally coupled between said first and second digital signal processors over a synchronous interface.

10. A digital communication device for transmitting and receiving voice and data communications, comprising:

a radio frequency (RF) subsystem for converting digital signals between baseband and RF signal frequencies in response to control signals;

a digital signal processor based baseband subsystem having an isolation interface bidirectionally coupled to said RF subsystem for transceiving RF signals at a first data rate and transceiving baseband signals at a second data rate to minimize signal interference between said RF and said baseband signals, said baseband subsystem operable to control a mode of operation of the digital communication device, to provide said control signals to said RF subsystem based on said mode of operation, wherein said isolation interface means includes:

a high speed interface for receiving and transmitting said baseband signals and control data from/to said baseband digital signal processor;

a low speed interface for receiving and transmitting said RF signals from/to said RF subsystem; and circuitry for processing said baseband signals and said RF signals.

11. A multi-mode, spread spectrum digital radio, operable in a first transmit mode and a second receive mode and having multiple submodes including a fixed frequency, frequency hopping, retransmit, bypass and remote submodes for transmitting and receiving plain text and encrypted voice and data communications, said digital radio comprising:

a radio frequency (RF) subsystem for converting spread spectrum digital signals comprising said voice and data communications between baseband and RF signal frequencies in response to control signals;

a digital signal processor-based baseband subsystem having:

an isolation interface means bidirectionally coupled to said RF subsystem over a low speed data interface at a first data rate and to a baseband digital signal processor over a high speed data interface at a second data rate for minimizing signal interface between said RF and said baseband signals;

a controller bidirectionally coupled to said baseband digital signal processor, a first digital signal processor and a secure processor means to provide control signals to control the mode of operation, and to enable selectable mode switching; and an interface means bidirectionally coupled to said first digital signal processor and responsive thereto for transceiving external data signals indicative of said voice and data communications over an at least one external interface;

wherein said baseband digital signal processor is bidirectionally coupled to said secure processor means over a first full duplex serial synchronous channel and a first full duplex control channel for transceiving encrypted/decrypted data signals;

wherein said baseband digital signal processor is bidirectionally coupled to said first digital signal processor over a second full duplex serial synchronous channel and a second full duplex control channel for transceiving bypass signals indicative of said voice communications; and wherein said first digital signal processor is bidirectionally coupled to said secure processor means over a third bidirectional channel for transceiving said encrypted/decrypted data signals.

12. The radio of claim 11, wherein said baseband digital signal processor is operable to receive said encrypted/decrypted data signals from said secure processor means indicative of said voice and data communications and send processed baseband signals indicative of said voice and data communications when said radio is configured in said transmit mode; and wherein said baseband digital signal processor is operable to receive signals indicative of said received RF signals from said isolation means and send processed baseband signals to said secure processor means indicative of said received RF signals when said radio is configured in said receive mode.

13. The radio of claim 11, said baseband subsystem further including:

an ancillary digital signal processor bidirectionally coupled to said baseband digital signal processor for transceiving data signals indicative of said voice and data communications and operable when said radio is configured in said retransmit and said remote submodes.

14. The radio of claim 13, further including a low power mode, wherein said first digital signal processor, said baseband digital signal processor and said ancillary digital signal processor are operable to transition from an active energy state to a low energy state upon completion of processing, whereby less power is consumed by said radio.

15. The digital radio of claim 13, wherein said ancillary digital signal processor includes:

a TI 320C5X fixed point DSP;

a 1MEG×16 bank switched program memory flash EPROM;

a 256 K×16 bank switched static RAM.

16. The radio of claim 11, wherein said baseband digital signal processor is operable to transceive bypass signals indicative of said voice communications when said radio is configured in said bypass submode.

17. The radio of claim 11, wherein said at least one external interface includes:

an analog voice interface;

a global positioning system (GPS) data interface;

a packet waveform interface;

a multi-bit rate MIL 188-114 interface.

18. The radio of claim 11, wherein said first digital signal processor includes:

a TI 320C5X fixed point DSP;

a 1MEG×16 bank switched program memory flash PROM;

a 512 K×16 bank switched static RAM;

wherein said baseband digital signal processor includes:

a TI 320C5X fixed point DSP;

a 1MEG×16 bank switched program memory flash EPROM;

a 256 K×16 bank switched static RAM;

and wherein said controller includes:

a 80C51 variant microcontroller;

a 256 K×8 bank switched program memory flash PROM;

a 32 K×8 data memory RAM;

a 1 K×8 EEPROM.

19. The digital radio of claim 11, further including means for selectively energizing said baseband and said RF subsystems, said means selectively partitioned to minimize signal interference between said RF and said baseband subsystems, said means including:

first energizing means for energizing said controller, said first digital signal processor, said interface means; said secure processor means and said baseband digital signal processor; and second energizing means for energizing said RF subsystem and said isolation interface means.

20. A communication device, comprising:

an RF subsystem adapted to receive RF signals carrying information and to convert the RF signals to baseband signals;

a baseband subsystem adapted to extract the information from the baseband signals; and an isolation interface coupling said RF subsystem to said baseband subsystem and communicating the baseband signals between said RF and baseband subsystems, said isolation interface communicating with said baseband subsystem at a first data rate and communicating with said RF subsystem at a second data rate that is lower than the first data rate, in order to minimize interference between the RF signals and noise from clocking signals within said baseband subsystem and from signals communicated between said baseband subsystem and said isolation interface at the first data rate.

21. The communication device of claim 20, further comprising:

a first power source configured to supply power to said baseband subsystem; and a second power source configured to separately supply power to said RF subsystem, thereby minimizing stray signal interference between said RF and baseband subsystems.

22. The communication device of claim 21, wherein said second power source is configured to supply power to said isolation interface.

23. The communication device of claim 20, wherein said isolation interface comprises:

a high speed data interface for communicating with said baseband subsystem; and a low speed data interface for communicating with said RF subsystem.

24. The communication device of claim 20, wherein control signals communicated between said baseband subsystem and said RF subsystem are sent through said isolation interface.

25. The communication device of claim 20, wherein all signals communicated between said baseband subsystem and said RF subsystem are sent through said isolation interface.

26. The communication device of claim 20, wherein said isolation interface receives baseband transmission signals from said baseband subsystem at the first data rate, and said RF subsystem receives the baseband transmission signals from said isolation interface and the second data rate, converts the baseband transmission signals to RF transmission signals, and transmits the RF transmission signals.

27. In a communication device having an RF subsystem and a baseband subsystem coupled via an isolation interface, a method of minimizing interference between RF signals in the RF subsystem and noise from signals within and transmitted by the baseband subsystem, comprising the steps of:

(a) transmitting signals between the isolation interface and the baseband subsystem at a first data rate; and (b) transmitting signals between the RF subsystem and the isolation interface at a second data rate that is lower than the first data rate, such that interference between the RF signals and noise from clocking signals within the baseband subsystem and from signals communicated between the baseband subsystem and the isolation interface at the first data rate is minimized.

28. The method of claim 27, further comprising the steps of:

(c) supplying power to the baseband subsystem from a first power source; and (d) separately supplying power to the RF subsystem from a second power source in order to minimize stray signal interference between the RF and baseband subsystems.

29. The method of claim 28, further comprising the step of:

(e) supplying power to the isolation interface from the second power source.

30. The method of claim 27, further comprising the step of:

(c) transmitting control signals from the baseband subsystem to the RF subsystem through the isolation interface.

31. The method of claim 27, further comprising the step of:

(c) transmitting all signals sent between the RF and baseband subsystems through the isolation interface.

32. A communication device, comprising:

a controller providing a user interface for managing a mode of operation of said communication device and for generating first, second and third control signals for controlling operation of the communication device;

a first digital signal processor responsive to the first control signal for transmitting and receiving non-encrypted data signals indicative of voice or data communications to and from an external interface;

a second digital signal processor responsive to the second control signal for transceiving, modulating and demodulating encrypted data signals; and a secure processor coupled to said first and second digital signal processors and responsive to the third control signal for encrypting data signals being transmitted from said first digital signal processor to said second digital processor and for decrypting data signals being transmitted from said second digital signal processor to said first digital signal processor;

wherein said controller controls the mode of operation os said communication device by coordinating operation of said first and second digital signal processors and said secure processor via separate control signals.

* * * * *